June 23, 1970   J. F. McCORMICK   3,516,164
AUTOMATIC MEASURING DEVICE
Filed March 28, 1969
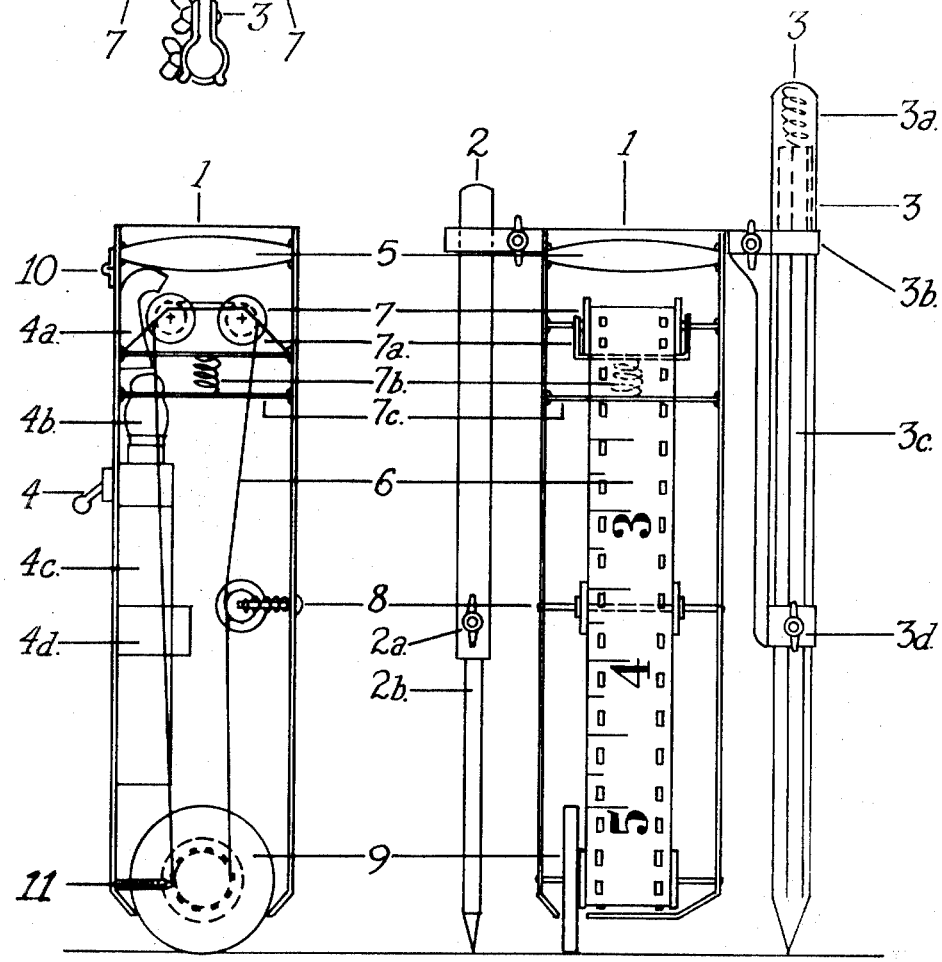
Inventor:
James F. McCormick United States Patent Office 3,516,164
Patented June 23, 1970

3,516,164
AUTOMATIC MEASURING DEVICE
James F. McCormick, 51 Bleeker St.,
Newark, N.J. 07102
Filed Mar. 28, 1969, Ser. No. 811,418
Int. Cl. B43l 9/02; G01b 3/12
U.S. Cl. 33—27                                    2 Claims

ABSTRACT OF THE DISCLOSURE

A combined marking and measuring instrument for tracing exterior and interior paths, marking said paths, and measuring the length or distance traversed by said instrument following said path; wherein the instrument has three closely spaced together elements including a scribe, a marking element, and a roller; and an elongated measuring tape driven by movement of said roller as the instrument traverses the path.

---

This invention relates to marking and measuring instruments that are adapted to be manually traversed over a given path on an interior or exterior surface, and to jointly mark the path being traversed and provide a measurement of the distance traveled.

FIG. 1 is a plan view of a preferred instrument according to the invention viewed from the top and through the magnifying lens, FIG. 2 is a sectional view taken lengthwise along lines 2—2 of FIG. 1, and FIG. 3 is a sectional view taken lengthwise through the instrument along lines 3—3 in FIG. 1.

Detailed description of a preferred embodiment of the invention

As shown in the drawings, and referring initially to FIG. 3, the instrument generally comprises a member 1 providing three closely spaced supporting positions with respect to a base or surface. At the first position is disposed a scribe member 2 having an elongated shaft or shank 2b oriented lengthwise or axially with respect to the instrument, and pivotably supported within a housing 2a and removably clamped thereto by such means as wing nuts, as is common.

At a second closely spaced position there is provided a marking element 3c, such as a pencil, that is also axially disposed along the instrument and substantially parallel to the scribe member 2b. The pencil 3c is supported for axial movement by a lower guide ring shaped member 3d at a mid-lower portion, and by a pivotable upper ring shaped member 3b; and free to move axially upwardly and downwardly within said guide members. A hollow cap 3 retained by the upper ring guide member 3b receives the upper end of the marking element or pencil and is provided with an internal spring 3a located inside of the cap for urging the marker 3c downwardly against the surface to be marked.

The central portion of the instrument is occupied by a lower roller member 9 disposed within a central housing portion of the frame 1, and being operatively connected to drive an endless measuring tape 6 by means of sprocket holes in the tape being positively driven by corresponding projections suitably provided on the side of the roller member 9, as best shown in FIG. 2. The upper end of the endless measuring tape passes about a pair of upper guide rollers 7 that are supported within a roller assembly 7a that is slideable upwardly and downwardly within the center housing of the frame member. A compression spring 7b disposed inside of the housing operates upon the lower portion of the roller assembly 7a to constantly exert an upwardly acting force on the upper idler wheels 7 and on the measuring tape to maintain the tape in a taut condition. A spring pressed idler wheel 8 is also provided in the side of the central portion of the housing 1 to bear against the measuring tape as best shown in FIG. 2 for the same purpose.

Additionally disposed inside of the central portion of the housing 1 there is provided a miniaturized light bulb 4b, a manually operated electrical switch 4, and a miniaturized electrical battery 4c, being detachably supported within the housing by a bracket 4d. Disposed above the miniaturized light bulb 4b there is provided a light focusing means in the form of a plastic light pipe 4a for focusing light from the bulb at the upper portion of the measuring tape. Immediately above and supported within the central portion of the housing 1 there is provided a magnifying lens 1 for observing in enlarged form the markings on the measuring tape 2, as best shown in FIG. 1. As can be observed by comparing FIGS. 1 and 2, the light pipe 4a directs the illuminating source of light directly on that portion of the measuring tape disposed beneath the magnifying lens 5.

As best seen in FIG. 3, the scribe element 2b, the roller 9, and marker 3c are located quite closely together occupying a minimum of cross sectional area. This enables the instrument to follow curves and lines on either exterior or interior surfaces. When the instrument is disposed so that the roller element 9 and the scribe are both bearing against the surface, the spring 3a urges the marker element 3c downward against the surface to insure that the marker will always provide a positive marking on the path being followed by the instrument.

For enabling all of these functions to be performed as well as providing space for the lighting apparatus, magnifier, and other elements of the preferred instrument, the instrument is made many times longer than its cross-sectional length and width. Accuracy in measuring length is enabled by using a very elongated endless measuring tape 6 having distance graduations that are spaced quite far apart.

This ruling device will measure, mark and read any shape or form and circles in the dark. The tape lights up and is magnified. It is 4½ inches high, 1 inch across and 1¼ inches wide, with the driving wheel on the bottom geared to the tape and rotates with the movement of the hand from left to right. The rotating wheel has a spring lock arm that locks when the hand movement stops and releases when the hand moves again to measure. It is a 12 inch circular tape and can measure feet and circles. Can be used to draw color designs by inserting colored pencils in the pencil holder and will give the right reading on each line that is colored. The device is compact and accurate. This device will draw direct line from the inside or outside of a corner and the tape is also perforated to allow the light to come through numerals.

I claim:

1. A manually operated combined marking and measuring instrument for tracing exterior and interior paths to be investigated and providing a precise measurement of the distance traversed by the instrument as well as a marking of the path followed by the instrument on the surface comprising: an elongated support member having an axial length many times greater than its cross-sectional length and width; a scribe element axially and pivotally retained by the support at one side thereof, a marking element axially and pivotally retained by the support member at a second side thereof, and a roller element rotatably mounted with respect to the support member between said scribe and marker elements and at one end of the support member for engagement with the surface to be measured, said roller element and said scribe element being pivotally mounted with respect to the support, and said marker element being axially displaceable and spring supported with respect to said support so as to be urged against a surface for positive marking engagement therewith, a flexible endless measuring tape being supported for rotative movement near opposite ends of said elongated support member and being driven by rotation of said roller member.

2. In the instrument of claim 1, a magnifying lens supported by said member for reading the markings on said measuring tape, a miniaturized light source and energizing battery carried by said member, and optical means for focusing light from said light source at the portion of the measuring tape being observed by said magnifying lens.

References Cited

UNITED STATES PATENTS

| | | |
|---|---|---|
| 391,067 | 10/1888 | Owen. |
| 2,108,251 | 2/1938 | Clark. |
| 2,878,566 | 3/1959 | Mellen. |

FOREIGN PATENTS

| | | |
|---|---|---|
| 540,735 | 9/1955 | Belgium. |
| 942,170 | 4/1956 | Germany. |

HARRY N. HAROIAN, Primary Examiner

U.S. Cl. X.R.

33—141